United States Patent
Katayama

(10) Patent No.: US 7,660,469 B2
(45) Date of Patent: Feb. 9, 2010

(54) IMAGE DECODING APPARATUS AND IMAGE DECODING METHOD

(75) Inventor: Yoichi Katayama, Kanagawa (JP)

(73) Assignee: NEC Electronics Corporation, Kawasaki, Kanagawa (JP)

(*) Notice: Subject to any disclaimer, the term of this patent is extended or adjusted under 35 U.S.C. 154(b) by 608 days.

(21) Appl. No.: 10/577,769

(22) PCT Filed: Oct. 26, 2004

(86) PCT No.: PCT/JP2004/016200

§ 371 (c)(1),
(2), (4) Date: Apr. 28, 2006

(87) PCT Pub. No.: WO2005/043919

PCT Pub. Date: May 12, 2005

(65) Prior Publication Data

US 2007/0071332 A1 Mar. 29, 2007

(30) Foreign Application Priority Data

Oct. 30, 2003 (JP) .............................. 2003-370733

(51) Int. Cl.
G06K 9/36 (2006.01)

(52) U.S. Cl. .................................................. 382/232

(58) Field of Classification Search ................. 382/232, 382/233, 236, 238, 239, 240, 245–253; 348/384.1, 348/387.1, 390.1, 394.1–395.1, 400.1–416.1, 348/420.1; 375/240, 240.02–240.24; 358/426.03–426.07

See application file for complete search history.

(56) References Cited

U.S. PATENT DOCUMENTS

| | | | | |
|---|---|---|---|---|
| 5,155,852 A | * | 10/1992 | Murakami et al. | 718/100 |
| 6,101,276 A | * | 8/2000 | Adiletta et al. | 382/236 |
| 6,483,945 B1 | * | 11/2002 | Kato | 382/236 |
| 6,539,054 B1 | * | 3/2003 | Matsui et al. | 375/240.08 |
| 6,549,663 B1 | * | 4/2003 | Yokose et al. | 382/232 |
| 6,961,475 B2 | * | 11/2005 | Schwartz et al. | 382/248 |
| 7,418,146 B2 | * | 8/2008 | Watanabe et al. | 382/247 |

FOREIGN PATENT DOCUMENTS

| | | |
|---|---|---|
| EP | 0 910 219 A2 | 4/1999 |
| EP | 1 233 625 A2 | 8/2002 |
| JP | 11-122624 | 4/1999 |
| JP | 2002-10216 | 1/2002 |
| JP | 2002-325257 | 11/2002 |
| JP | 2003-101788 | 4/2003 |

* cited by examiner

Primary Examiner—Jose L Couso
(74) Attorney, Agent, or Firm—McGinn IP Law Group, PLLC

(57) ABSTRACT

An image decoding apparatus includes an analyzing section and an image decoding section. The analyzing section determines a process quantity of a coded image data to each of a plurality of image decoding processes within a unit process time based on a parameter of the coded image data, prior to the plurality of image decoding processes. The image decoding section carries out each of the plurality of image decoding processes to the coded image data for the determined process quantity such that a decoded image data is generated from the coded image data.

12 Claims, 19 Drawing Sheets

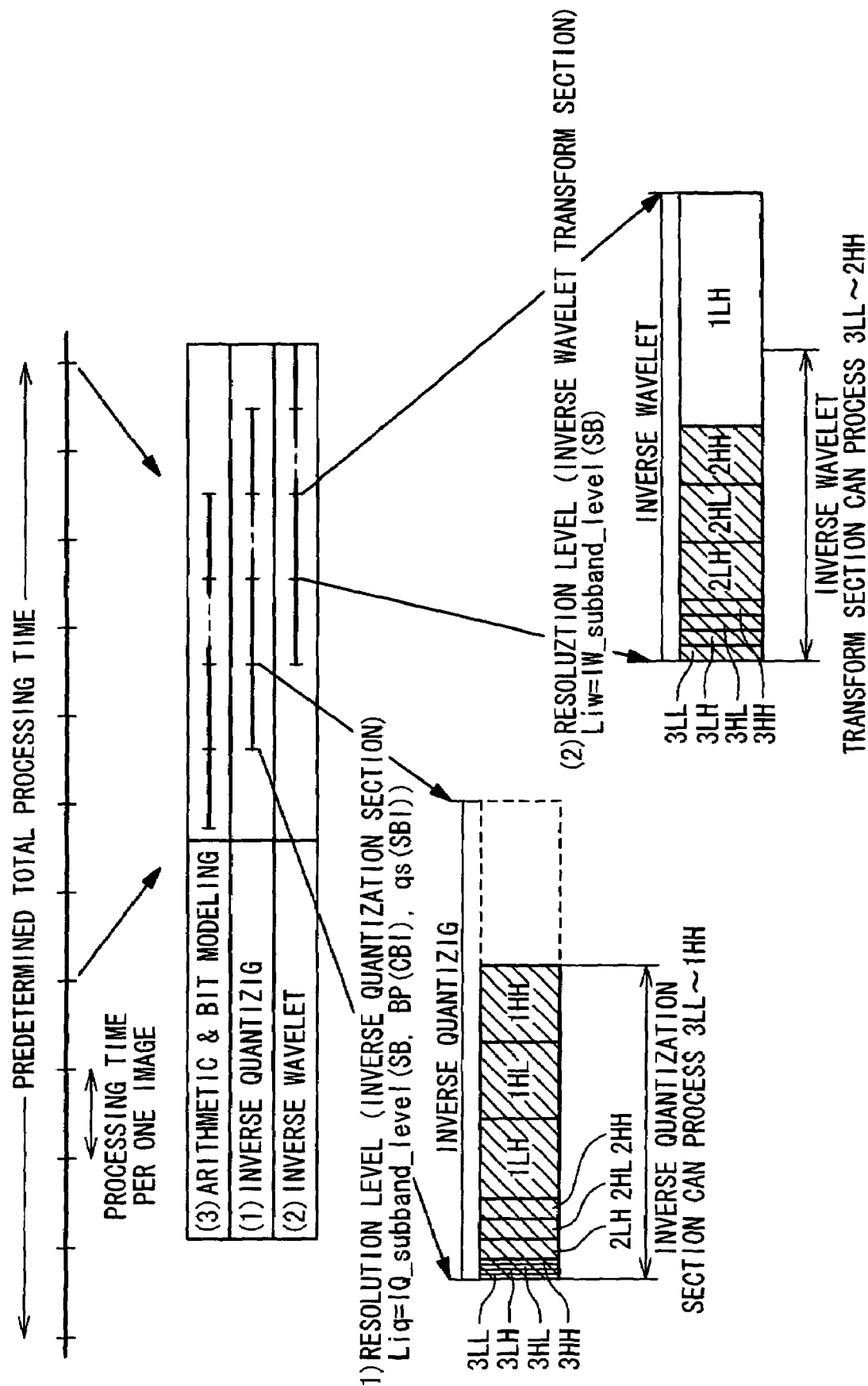

Fig. 10B

| TIME | level_countor | OUTPUT RESOLUTION LEVEL COUNT Liq (=(Level_max+1)-level_counter=(3+1)-level_counter)) |
|---|---|---|
| t=tQ3LL (=t0) | 0 | 4 |
| t0+3*4$^0$*tQ3LL (=t1) | 1 | 3 |
| t1+3*4$^1$*tQ3LL (=t2) | 2 | 2 |
| t2+3*4$^2$*tQ3LL (=t3) | 3 | 1 |

Fig. 11B

| TIME | level_countor | OUTPUT RESOLUTION LEVEL COUNT Liw (=(Level_max+1)-level_counter=(3+1)-level_counter) |
|---|---|---|
| 0 | 0 | — |
| $4^0 *tW3LL \rightarrow W2LL$ (=t0) | 1 | 3 |
| $t0+4^1 *tW3LL \rightarrow W2LL$ (=t1) | 2 | 2 |
| $t1+4^2 *tW3LL \rightarrow W2LL$ (=t2) | 3 | 1 |

IMAGE DECODING APPARATUS AND IMAGE DECODING METHOD

TECHNICAL FIELD

The present invention relates to an image decoding apparatus and an image decoding method.

BACKGROUND ART

In recent years, with the wide use of information equipments such as a personal computer, the population of a digital camera and a color printer, and the explosive increase of users of the Internet, the technique of a digital image has spread over daily life. The coding compression techniques such as JPEG (Joint Photographic Expert Group) and MPEG (Motion Picture Expert Group) are standardized for a static image and a video image, respectively.

On the other hand, the replaying technique of a recording media such as CD-ROM has been improved, and the convenience of the delivery and replaying of image data through transmission media such as a network or a broadcasting has been improved. As for the JPEG, JPEG 2000 as an evolution edition is released, and also goals in middle and long ranges of the MPEG are settled. In this way, it could be considered that the image processing technique for the information equipment could be further improved in future.

A conventional decoding method of the above JPEG 2000 is disclosed in Japanese Laid Open Patent Application (JP-P2002-325257A). FIG. 1 shows the structure of an image decoding apparatus 10 in this conventional example. This conventional image decoding apparatus 10 may be realized by a CPU, a memory, and other LSIs in hardware. Also, this conventional image decoding apparatus 10 may be realized by a program having an image decoding function in software. FIG. 1 is a schematic functional block diagram showing the image decoding apparatus realized through cooperation of them. Therefore, a person in the art could understand that the functional block can be realized by only the hardware, only the software or those combinations.

The above-mentioned image decoding apparatus 10 is composed of a decoding section 12 and a simplification section 30 mainly. The decoding unit 12 contains a stream analyzing section 14, an arithmetic decoding section 16, a bit modeling decoding section 18, an inverse quantization section 20 and an inverse wavelet transform section 24.

The stream analyzing section 14 receives and analyzes a compressed data (coded image data) CI, and the arithmetic decoding section 16 carries out an arithmetic decoding process to the coded image data CI based on the result of the analysis. The bit modeling decoding section 18 decodes the data obtained as the result of the arithmetic decoding process in the form of a bit plane for every color component, and the inverse quantization section 20 carries out an inverse quantization process to the decoding result by the bit modeling decoding section 18. The inverse wavelet transform section 24 carries out an inverse wavelet transform process to an image WIn of the n-th layer obtained as the result of the inverse quantization process. The inverse wavelet transform section 24 uses a frame buffer (not shown) as a work area. Finally, a decompressed image DI is outputted from the frame buffer.

On the other hand, the simplification section 30 contains a converting section 32, a time table 34 and a replay stop detecting section 36. The converting section 32 monitors the progress situation of the decoding process by the inverse wavelet transform section 24 and switches the decoding process to a simplifying process compulsorily, when the time exceeds a predetermined time limit. The time table 34 stores a time limit to be referred to by the converting section 32, and the replay stop detecting section 36 detects a fact that the user instructs the replay of the image to be stopped.

A frame which is being decoded and replayed when the user instructs suspension or end of the decoding or replaying operation is actually released from the time limit of the decoding process. Therefore, when the instruction of the suspension or end of the replaying operation is detected by the replay stop detecting section 36, the simplifying process to the frame by the converting section 32 is avoided and the replaying operation is fully carried out, like the usual manner. However, there is a case that the simplifying process by the converting section 32 has already begun. In such a case, the subsequent decoding process is carried out as usually as possible.

The converting section 32 refers to a clock signal CLK to measure the elapsed time. The clock signal CLK is frequency-divided in the converting section 32 according to necessity, and is counted by a counter (not shown) to measure a predetermined time. Also, the converting section 32 may refer to an externally provided time clock section such as a PIT (programmable interrupt timer) instead of the clock signal CLK. Also, in this example, the converting section 32 monitors the decoding process of the inverse wavelet transform section 24. However, it is not always necessary for the converting section 32 to monitor the decoding process of the inverse wavelet transform section 24. The elapsed time of either of the decoding processes from the stream analyzing section 14 to the inverse wavelet transform section 24 may be monitored.

As seen the above description, in the conventional image decoding apparatus, it is necessary to provide the converting section 32 to compulsively stop the decoding process for all or each of the decoding sections. Therefore, it is difficult to control the process time optimization of the whole system. Also, the converting section 32 compulsively stops the subsequent processes so that the control cannot be carried out accurately. As a result, it is difficult to suppress the degradation of image quality.

DISCLOSURE OF INVENTION

Therefore, an object of the present invention to provide an image decoding apparatus and an image decoding method, in which it is possible to carry out the control of process time optimization of the whole system so that the degradation of image quality can be suppressed.

In an aspect of the present invention, an image decoding apparatus includes an analyzing section and an image decoding section. The analyzing section determines a process quantity of a coded image data to each of a plurality of image decoding processes within a unit process time based on a parameter for the coded image data, prior to the plurality of image decoding processes. The image decoding section carries out each of the plurality of image decoding processes to the coded image data for the determined process quantity such that a decoded image data is generated from the coded image data.

Here, the parameter may an internal parameter of the coded image data, or maybe an external parameter for the coded image data. Instead, the parameter contains is an external parameter for the coded image data, and an external parameter for the coded image data.

Also, when the coded image data includes a plurality of code blocks, the analyzing section may determine the process quantity to each of the plurality of image decoding processes by determining a code block process quantity for each of the plurality of code blocks based on the unit process time.

Also, when the coded image data is a part of a coded stream, and a stream process time of the coded stream is previously determined, the unit process time may be determined based on a number of the coded image data in the coded stream and the stream process time. In this case, the plurality of decoding processes may contain an arithmetic decoding process, a bit modeling decoding process, an inverse quantization process and an inverse wavelet transform process. The image decoding section may carry out a set of the arithmetic decoding process and the bit modeling decoding process, the inverse quantization process, and the inverse wavelet transform process in a pipeline. In this case, the image decoding section may include an arithmetic decoding section which carries out the arithmetic decoding process to the coded image data for the determined process quantity; a bit modeling decoding section which carries out the bit modeling decoding process to a result of the arithmetic decoding process by the arithmetic decoding section in a form of bit planes every color component for the determined process quantity; an inverse quantization section which carries out the inverse quantization process to a result of the bit modeling decoding process by the bit modeling decoding section for the determined process quantity; and an inverse wavelet transform process section which carries out the inverse wavelet transform process to a result of the inverse quantization process by the inverse quantization section for the determined process quantity.

Also, when the coded image data is packed into a plurality of layers, the analyzing section may determine a number of layers to be decoded based on the process quantity of the coded image data in the inverse quantization process and the process quantity of the coded image data in the inverse wavelet transform process. The image decoding section may carry out each of the plurality of decoding processes to the coded image data for the determined number of layers to be decoded. In this case, the analyzing section may discard a part of the coded image data other than a part of the coded image data associating with the determined number of layers to be decoded. In this case, the plurality of decoding processes may contain an arithmetic decoding process, a bit modeling decoding process, an inverse quantization process and an inverse wavelet transform process, and each of the plurality of layers of the coded image data may contain a plurality of code blocks. The parameter desirably contains a weight coefficient allocated to each of the plurality of code blocks. The analyzing section may determine a number of coding paths in the arithmetic decoding process and the bit modeling decoding process to each of the plurality of code blocks from the weight coefficients and the unit process time, and may determine a number of bit planes from the determined coding paths. The image decoding section may carry out the inverse quantization process and the inverse wavelet transform process to the coded image data for the determined number of bit planes.

In another aspect of the present invention, an image decoding method of decoding a decoded image data from a coded image data through a plurality of decoding processes, is achieved by determining a process quantity of the coded image data in each of the plurality of image decoding processes within a unit process time based on a parameter of the coded image data; and by carrying out the plurality of image decoding processes to the coded image data for the determined process quantities.

Here, the parameter may an internal parameter of the coded image data, or maybe an external parameter for the coded image data. Instead, the parameter contains is an external parameter for the coded image data, and an external parameter for the coded image data.

Also, when the coded image data contains a plurality of code blocks, the determining a process quantity may be achieved by determining the process quantity by determining a code block process quantity allocated to each of the plurality of code blocks based on the unit process time. In this case, when the coded image data is a part of a coded stream, and a stream process time of the coded stream is predetermined, the image decoding method further may be achieved by determining the unit process time based on a number of the coded image data in the coded stream and the stream process time. Also, the plurality of decoding processes may contain an arithmetic decoding process, a bit modeling decoding process, an inverse quantization process and an inverse wavelet transform process. At this time, the carrying out the plurality of image decoding processes may be achieved by carrying out a set of the arithmetic decoding process and the bit modeling decoding process, the inverse quantization process, and the inverse wavelet transform process in a pipeline. In this case, the carrying out the plurality of image decoding processes may include carrying out the arithmetic decoding process to the coded image data for the determined process quantity; carrying out the bit modeling decoding process to a result of the arithmetic decoding process for the determined process quantity; carrying out the inverse quantization process to a result of the bit modeling decoding process for the determined process quantity; and carrying out the inverse wavelet transform process to a result of the inverse quantization process for the determined process quantity.

Also, when the coded image data is packed into a plurality of layers, the determining a process quantity may be achieved by determining a number of layers to be decoded based on the process quantities of the coded image data in the inverse quantization process and the process quantity of the coded image data in the inverse wavelet transform process. Also, the carrying out the plurality of image decoding processes may be achieved by carrying out each of the plurality of decoding processes to the coded image data for the determined number of layers to be decoded.

The image decoding method may further include discarding a part of the coded image data other than a part of the coded image data corresponding to the determined number of layers to be decoded.

Also, the plurality of decoding processes may contain an arithmetic decoding process, a bit modeling decoding process, an inverse quantization process and an inverse wavelet transform process. Each of the plurality of layers of the coded image data may contain a plurality of code blocks. The parameter contains a weight coefficient allocated to each of the plurality of code blocks. The determining a process quantity may include determining a number of coding paths in the arithmetic decoding process and the bit modeling decoding process to each of the plurality of code blocks from the weight coefficients and the unit process time; and determining a number of bit planes from the determined coding paths. The carrying out the plurality of image decoding processes may be achieved by carrying out the inverse quantization process and the inverse wavelet transform process to the coded image data for the determined number of bit planes.

In another aspect of the present invention, a computer-readable recording medium on which a software is recorded to realize the above image decoding method.

BRIEF DESCRIPTION OF DRAWINGS

FIGS. 7A and 7B are diagrams showing a method of allocating a unit process time in the image decoding apparatus according to the first embodiment of the present invention;

FIGS. 10A and 10B are a flow chart of the inverse quantization process to determine the number of layers to be processed and a diagram showing an example of a result of the inverse quantization process;

FIGS. 11A and 11B are a flow chart of the inverse wavelet transform process to determine the number of layers to be processed and a diagram showing an example of a result of the inverse wavelet transform process;

BEST MODE FOR CARRYING OUT THE INVENTION

Hereinafter, an image decoding apparatus of the present invention will be described in detail with reference to the attached drawings.

Figure 3:
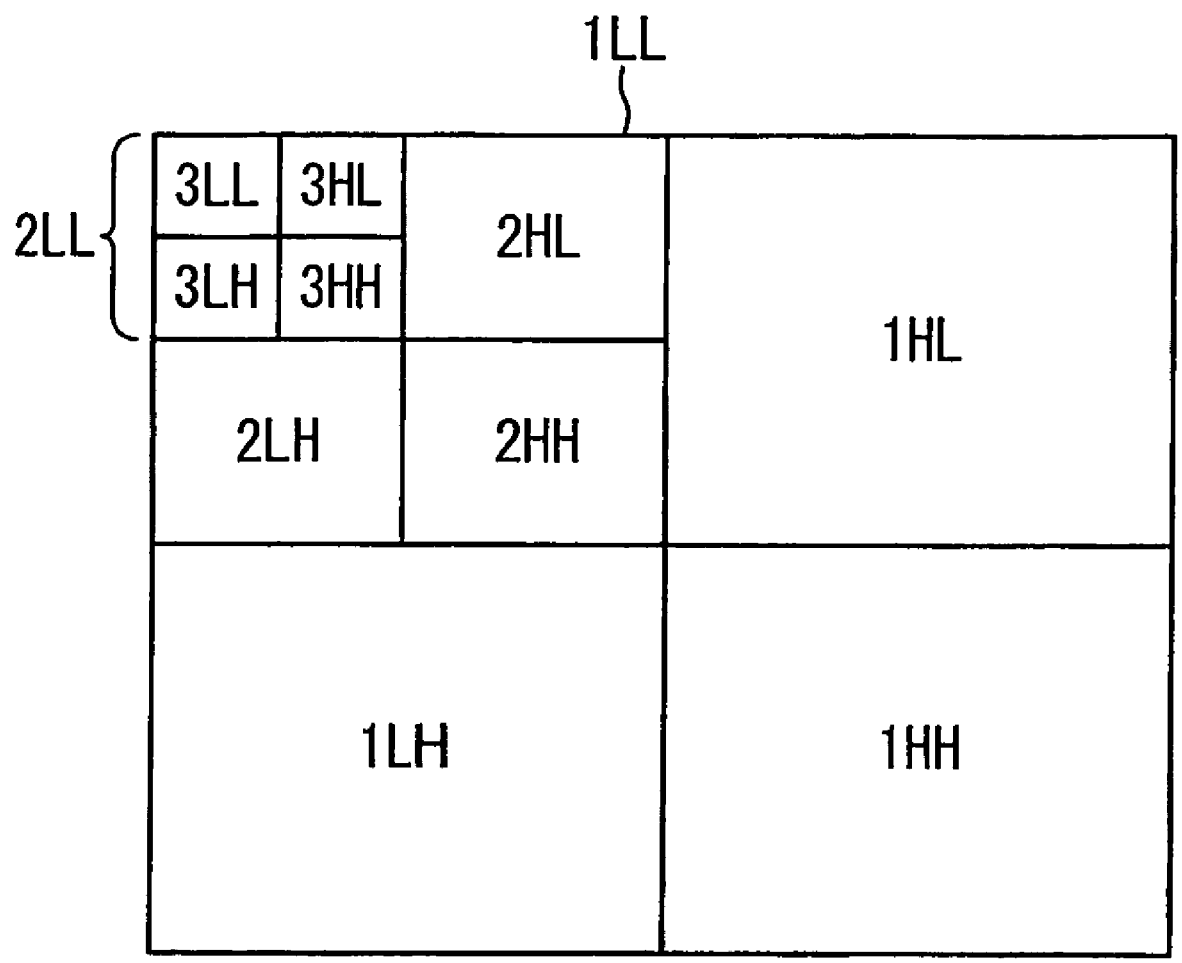
FIG. 3 is a diagram showing an example of an image to which JPEG coding is applied.

For easy understanding of the present invention, a coding procedure will be first described. In JPEG 2000, a Daubechies filter is used as a wavelet transform filter and its essence lies in the point that a high-pass filter and a low-pass filter are applied to an image in horizontal (x) and vertical (y) directions at the same time. Also, this filter has a function to reduce the number of pixels to ½ in both directions of x and y. Therefore, if the decompressed image DI is an original image in FIG. 1, an image WI1 of the first layer is generated to have code blocks (sub bands) of 1LL, 1LH, 1HL, and 1HH, when the wavelet transform process is carried out to this image once, as shown in FIG. 3. The 1LL code block shows a low frequency component of the image in the directions of x and y, and each of the HL code block and the LH code block shows a low frequency component of the image in one of the directions of x and y and a high frequency component in the other direction. The HH code block shows a high frequency component of the image in the directions of x and y. In this way, the low frequency component of the original image appears on the upper left portion (1LL portion) in the converted image.

When the second wavelet transform process is carried out, an image WI2 of the second layer is generated. The second wavelet transform process is carried out only to the LL code block of the code blocks of a layer obtained through the immediately previous wavelet transform process. Therefore, the 1LL code block of the image WI1 of the first layer is decomposed into four code blocks 2LL, 2HL, 2LH, 2HH in the image WI2 of the second layer. When the third wavelet transform process is carried out, an image WI3 of the third layer is generated. The third wavelet transform process is carried out only to the 2LL code block out of the image of the second layer. Therefore, the 2LL code block of the image WI2 of the second layer is decomposed into four code blocks 3LL, 3HL, 3LH, 3HH in the image WI3 of the third layer. The 3LL code block shows the lowest frequency component. Oppositely saying, the most basic nature of the original image can be replayed if this 3LL code block can be obtained, and it is possible to say that it is an important block. In the coding process, a coded stream CI is finally obtained through the quantization, and the other process after this.

Figure 2:
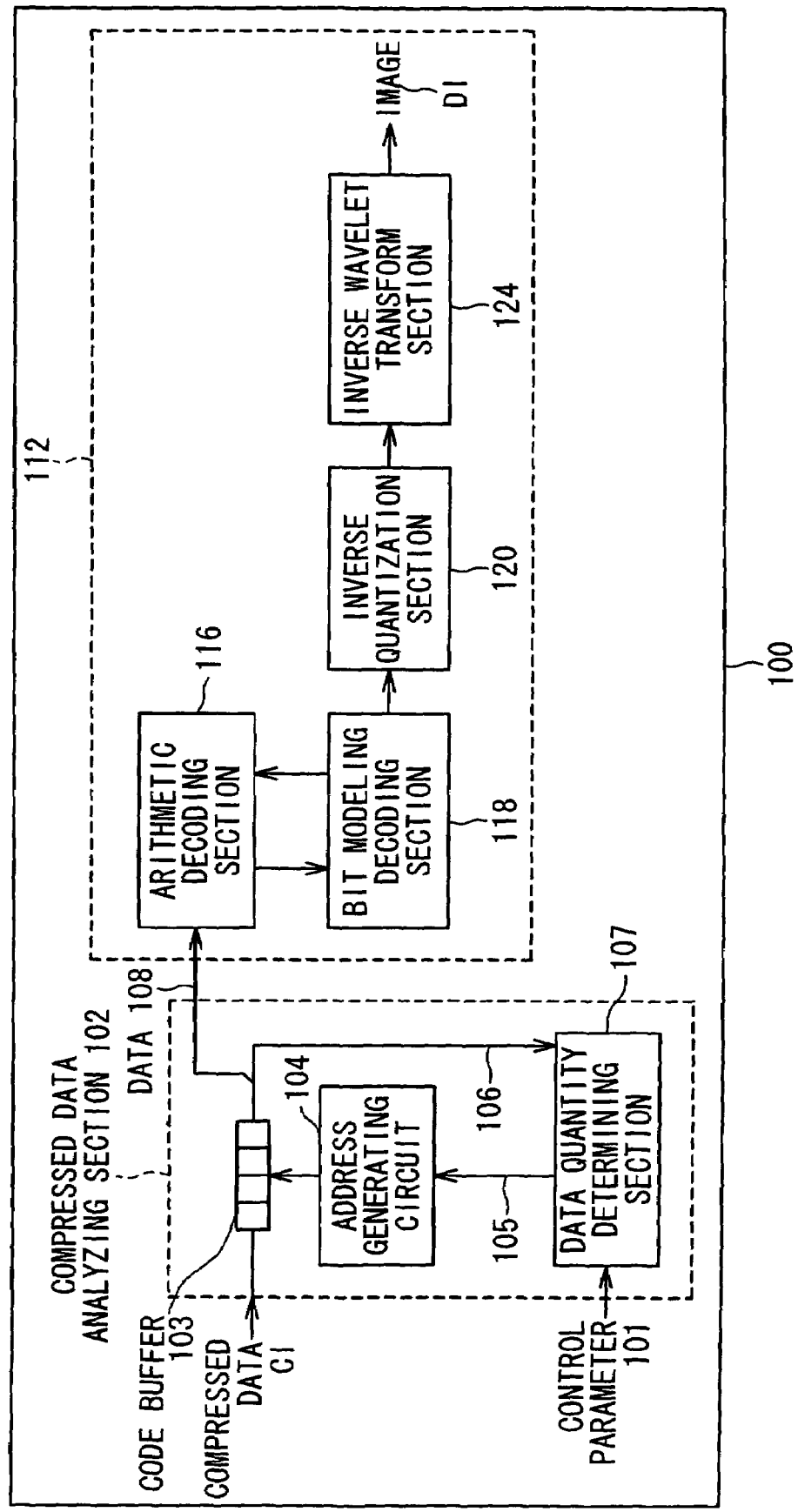
FIG. 2 is a block diagram showing the structure of an image decoding apparatus according to a first embodiment of the present invention.

Next, the image decoding apparatus according to the first embodiment of the present invention will be described. FIG. 2 is a block diagram showing the structure of the image decoding apparatus according to the first embodiment of the present invention. Referring to FIG. 2, the image decoding apparatus 100 according to the first embodiment of the present invention is composed of a compressed data analyzing section 102 and an image decoding section 112. The compressed data analyzing section 102 has a code buffer 103 which receives a compressed data (coded stream) CI, a data quantity determining section 107 and an address generating circuit 104 which receives the output 105 of the data quantity determining section 107. In the compressed data analyzing section 102, the code buffer 103 receives the compressed data (coded stream) CI, and stores therein. The compressed data may be a stream of compressed data (coded stream). The stored data is outputted to the data quantity determining section 107 in accordance with an address from the address generating circuit 104.

The data quantity determining section 107 calculates a process quantity such as a data quantity or process time in each of various processes. The data quantity determining section 107 is supplied with a control parameter 101 which contains a unit process time Ti of one frame image ($=t_{total}$/the total number of frames), the number of code blocks (SB), a code block size (CBS), the number of bit planes $BP(CB_i)$ ($CB_i$ shows a code block number (coordinate)), the number of quantization steps $qs(SB_i)$ ($SB_i$ shows a sub band number (coordinate)), and a weighting quantity $W(CB_i)$ of the code block $CB_i$. The data quantity determining section 107 analyzes the compressed data CI, determines the process quantity 105 every code block by using the control parameter 101 and outputs it to the address generating circuit 104. The address generating circuit 104 generates an address based on the process quantities 105 and output it to the code buffer 103. Thus, the whole or part of the compressed image is outputted as a data stream 108 from the code buffer 103 to the image decoding section 112 together with the process quantities. The image decoding section 112 decodes the data stream 108 outputted from the compressed data analyzing section 102 based on the determined process quantities 105 from the compressed data analysis section 102 and replays an original image (decompressed image) DI. In this case, the process quantities 105 may be outputted directly to the image decoding section 112 in addition to the address generating circuit 104. In such a case, the process quantities need not to be transferred to the image decoding section 112. It should be noted that the control parameter is externally supplied and the data quantity determining section 107 determines the process quantity 105 every code block by using the control parameter 101 in the above description. However, the control parameter 107 may be all contained in the coded stream CI. In this case, the control data is read out from the coded stream and the above process is carried out. Instead, a part of the control parameter may be externally supplied and the other may be contained in the coded stream CI.

Figure 16:
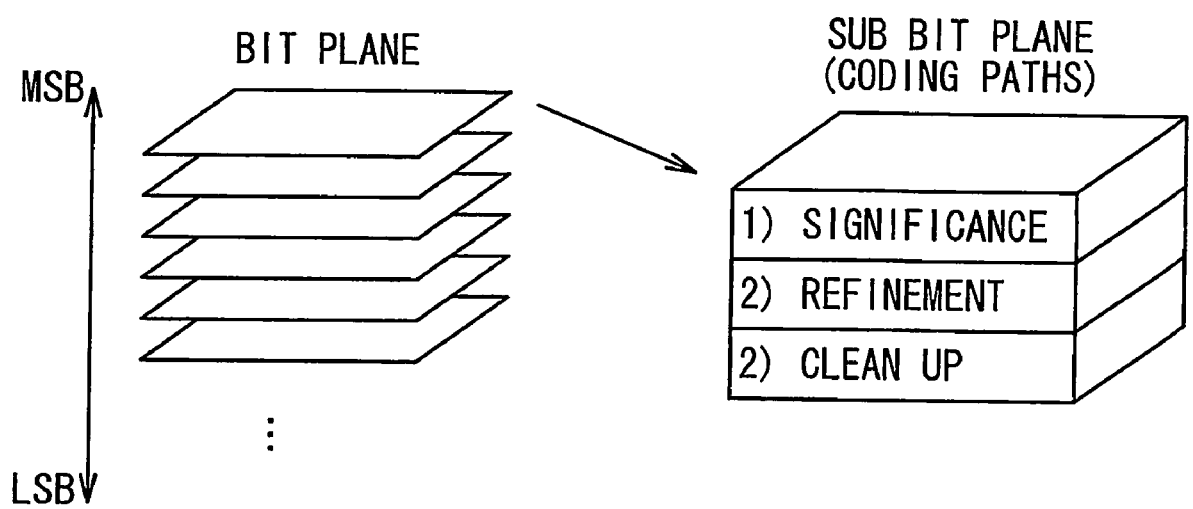
FIG. 16 is a diagram showing decomposition of each code block into coding paths.

The image decoding section 112 is composed of an arithmetic decoding section 116, a bit modeling decoding section 118, an inverse quantization section 120 and an inverse wavelet transform section 124. The arithmetic decoding section 116 carries out an arithmetic decoding process to the data stream 108 from the compressed data analyzing section 102 based on the process quantity for the arithmetic decoding process. The bit modeling decoding section 118 carries out a bit modeling decoding process to the decoded data (context) obtained as a result of the decoding process by the arithmetic decoding section 116 in the form of the bit plane every color component based on the process quantity for the bit modeling decoding process. As shown in FIG. 16, in the bit modeling decoding process, contexts of coefficient bits are checked after a bit plane decomposition is carried out to each code block. Thus, each of the bit planes is decomposed into three coding paths (sub bit planes), which are ordered. This is called the coefficient bit modeling. Each coding path is subjected to an arithmetic coding process. The inverse quantization section 120 carries out an inverse quantization process to a processing result by the bit modeling decoding section 118 based on the process quantity for the inverse quantization process. The inverse wavelet transform section 124 carries out an inverse wavelet transform process to the image WIn of the n-th layer obtained as a result of the inverse quantization process based on the process quantity for the inverse wavelet transform process.

The image decoding apparatus of the present invention can be realized by a CPU, a memory, and other LSIs in hardware. Similarly, the image decoding apparatus of the present invention can be realized by a program having an image decoding function in software. FIG. 2 is a functional block which is realized through their cooperation. It could be easily understood to a person in the art that the functional block can be realized by only the hardware, only the software or those combinations.

Next, the operation of the data quantity determining section 107 in the image decoding apparatus 100 according to the first embodiment of the present invention will be described.

Figure 6:
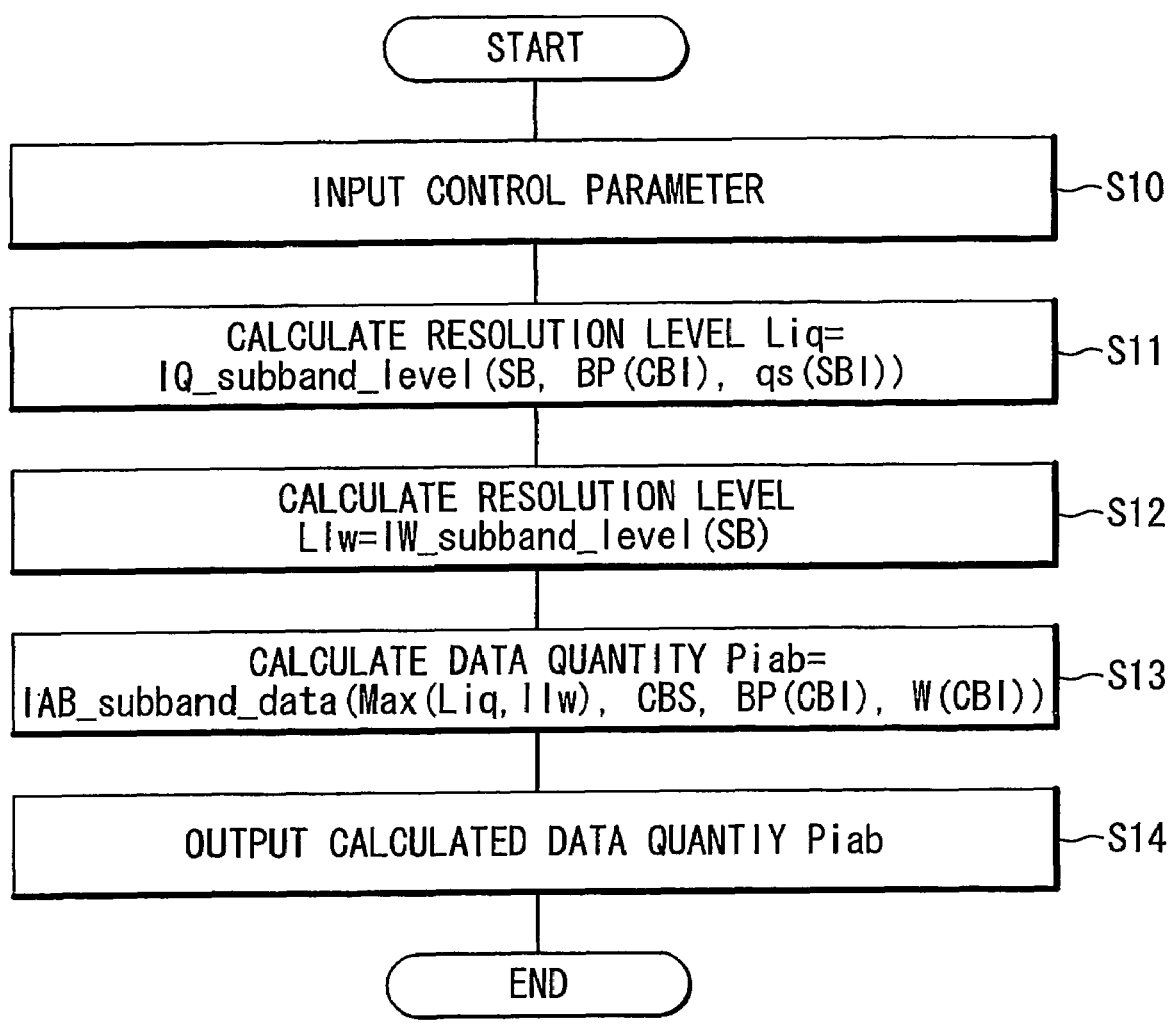
FIG. 6 is a flow chart showing an operation of the image decoding apparatus according to the first embodiment of the present invention.

As shown in FIG. 6, first, a coded stream CI is supplied and is stored in the code buffer 103. The control parameter 101 is supplied to the data quantity determining section 107 (Step S10). The control parameter 101 contains a unit process time Ti of one image ($=t_{total}$/the total number of frames), the number of code blocks (SB), a code block size (CBS), the number of bit planes BP(CBi) (CBi shows a code block number (coordinate)), the number of quantization steps qs(SBi) (SBi shows a sub band number (coordinate)), and a weighting coefficient W(CBi) of the code block CBi.

Subsequently, the data quantity determining section 107 determines process quantities of the arithmetic decoding section 116, bit modeling decoding section 118, inverse quantization section 120 and inverse wavelet transform section 124 prior to the decoding processing in the image decoding section 112. For example, the data quantity determining section 107 calculates a process time for the arithmetic decoding process by the arithmetic decoding section 116, a process time for finally outputting quantized data in the form of the bit plane every color component from the data, which is obtained as a result of the arithmetic decoding process, by the bit modeling decoding section 118, a process time for inversely quantization process by the inverse quantization section 120 to the processing result in the bit modeling decoding section 118 and a process time for carrying out the inverse wavelet transform operation by the inverse wavelet transform section 124 to the image WIn of the n-th layer obtained as a result of the inverse quantization process. More specifically, a whole process time ($t_{total}$) and the unit process time Ti for one frame image previously allocated to the image decoding apparatus 100 according to the first embodiment of the present invention are confirmed. After that, first, a data quantity processable within the unit process time Ti by the inverse quantization section 120 is determined. Subsequently, a data quantity processable within the unit process time Ti by the inverse wavelet transform process section 124 is determined. Lastly, a data quantity processable within the unit process time Ti by the arithmetic decoding section and a data quantity processable within the unit process time Ti by the bit modeling decoding section are determined.

That is, an inverse quantization process resolution levels IQ_subband_level (SB, BP(Cbi), qs(Sbi) is calculated (Step S11). Subsequently, an inverse wavelet decoding process resolution level IW_subband_level (SB) is calculated (Step S12). After that, the number of the layers which can be processed within the unit process time Ti is determined from the inverse quantization process resolution level and the inverse wavelet decoding process resolution level. Subsequently, the data quantity IAB_subband_proc(Max(Liq,Liw),CBS,BP(Cbi),W(Cbi)) for the arithmetic decoding process and bit modeling decoding process is calculated based on the determined number of layers (Step S13).

In this way, the process by the inverse quantization section and the process by the inverse wavelet transform process section in which the data quantity is smaller are first estimated and then the arithmetic decoding process and the bit modeling decoding process are estimated. After that, data of each of the code blocks for the determined number of layers is read from the code buffer 103 and is supplied to the image decoding section 112. The other code blocks of the image are discarded.

Figure 4:
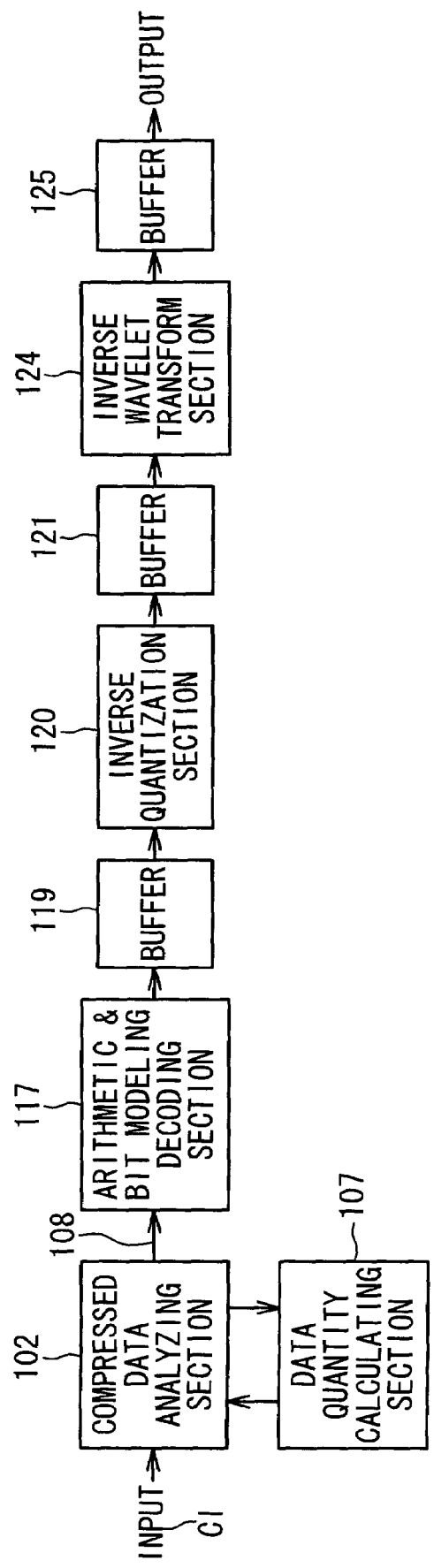
FIG. 4 is a block diagram showing the structure of a modification example of the image decoding apparatus according to the first embodiment of the present invention.

Within the calculated data quantity, the arithmetic decoding process is carried out by the arithmetic decoding section 116, and the bit modeling decoding process is carried out by the bit modeling decoding section 118. After that, the inverse quantization process is carried to the data after the bit modeling decoding process out by the inverse quantization section 120 within the calculated data quantity. At this stage, the same images WIn of n layers as those obtained when the inverse wavelet transform processes is carried out to the original image n times are obtained. Subsequently, the inverse wavelet transform process is carried out to these images (n−1) times by the inverse wavelet transform section 124 within the calculated process time and the image WI1 of the first layer is generated. Moreover, the inverse wavelet transform process is carried out once more to this image. Thus, the decompressed image DI is obtained. It should be noted that the above structure is shown in FIG. 4, including buffers.

As mentioned above, the arithmetic decoding process, the bit modeling decoding process, the inverse quantization process and the inverse wavelet decoding process are carried out to the compressed image. However, the data quantities of the above-mentioned processes to the one frame image are different. Therefore, if the decoding process of all the code blocks CB from 3LL to 1LL is carried out when the compressed image CI is the image of the third layer, a leaning is caused among the process times and it is not efficient. When a plurality of continuous images are decoded, it is efficient to carry out pipeline processing. However, the pipeline processing cannot be carried out if there is any leaning in the process time.

Figure 1:
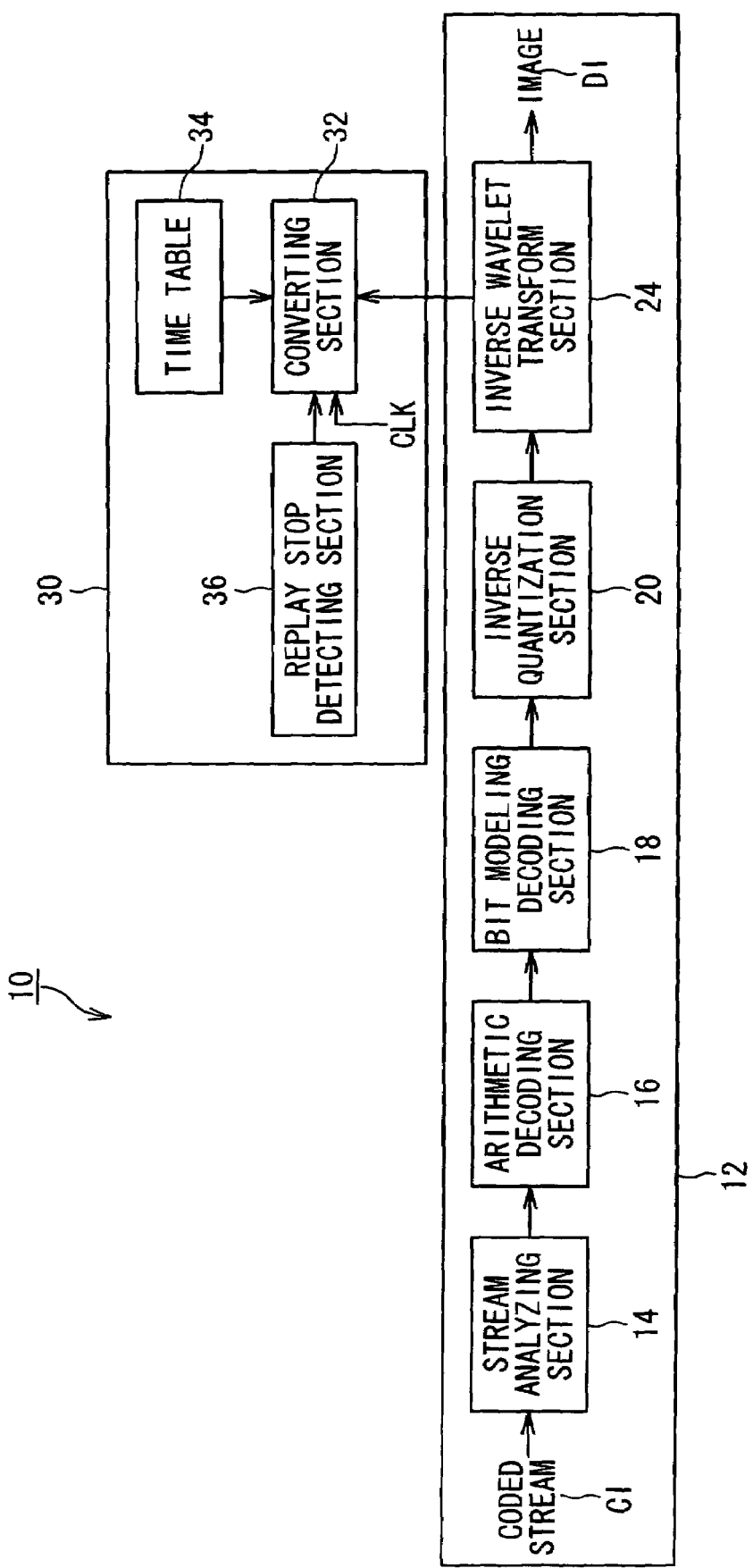
FIG. 1 is a block diagram showing the structure of a conventional image decoding apparatus.

For the above reasons, as shown in FIG. 1, the pipeline processing has been conventionally carried out in units of images and a process which cannot be ended within the unit process time is ignored. Therefore, depending on the image, there is a case that the processes from the arithmetic decoding process to the inverse wavelet decoding process are fully carried out, but there is a case that the arithmetic decoding process to the inverse quantization process are fully carried out but the inverse wavelet decoding process is stopped on the way because of the limitation of the process time. Thus, a deviation occurs between the data quality of the decompressed image.

Figure 5:
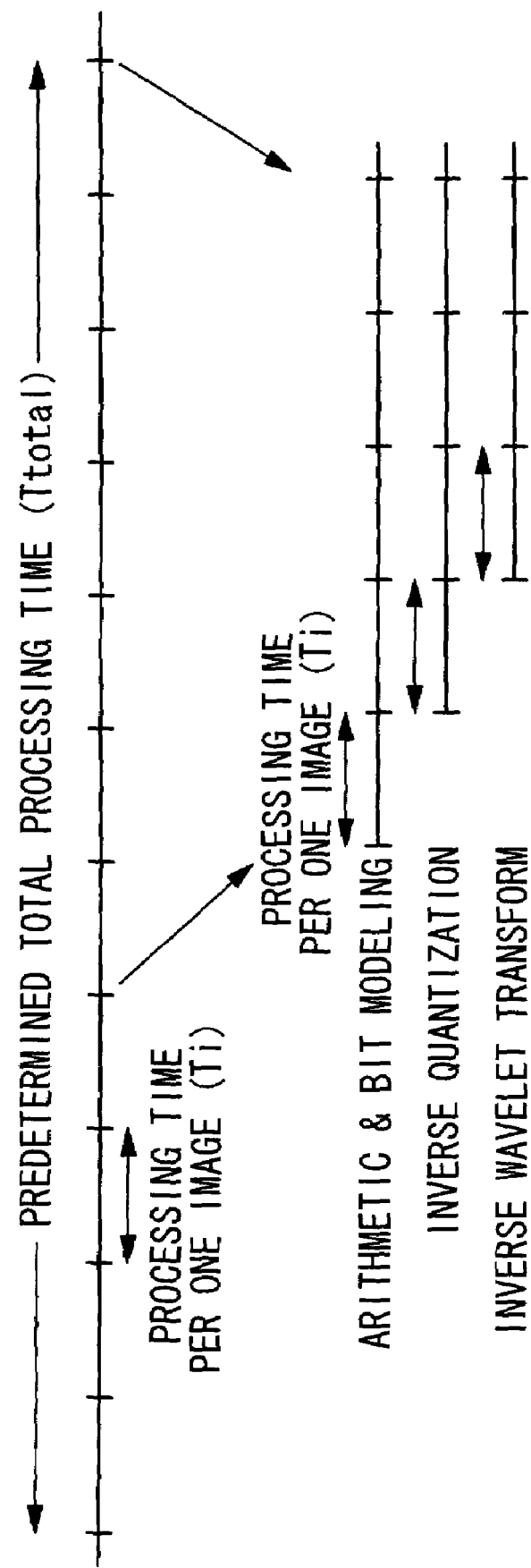
FIG. 5 is a diagram showing a pipeline processing of the image decoding apparatus according to the first embodiment of the present invention.

In the present invention, the decoding processes are divided into three process groups, i.e. a group of the inverse quantization process, a group of the inverse wavelet decoding process and a group of the process of the arithmetic decoding process and the bit modeling decoding process. FIG. 5 schematically shows each process by taking the horizontal axis as the time axis. Referring to FIG. 5, when a predetermined time is allocated, the unit process time Ti which can be allocated to one frame image is determined based on the number of frame images and the predetermined time. Thus, the process time which is allocated to each of the above three processes is estimated and predetermined. For this reason, as shown in FIG. 5, each process can be carried out in a pipeline from the MSB side of the bit plane layers within the process time previously allocated to the process. Thus, each process group is carried out primarily from the bit plane which has large influence in perception so that the quality of the obtained image becomes stable.

A procedure of the estimation of the number of bit plane layers to be processed at the steps S11 and S12 is shown in FIG. 7A. Now, it is supposed that the compressed image CI is the 3-layer image. At the step S11 of FIG. 6, the process time of the inverse quantization process to the compressed image is estimated. As shown in FIG. 7A, the inverse quantization process of the code books from 3LL to 1HH can be completed within the unit process time Ti. Subsequently, the process time of the inverse wavelet decoding process to the compressed image is estimated at the step S12. As shown in FIG. 7A, only the code books from 3LL to 1LH are ended within the unit process time Ti in the inverse wavelet decoding process. Because the slower one of the processes of the steps S11 and S12 determines the whole throughput, it is estimated that the decoding process of 2 layers is possible as the whole of system. That is, it is estimated that the code books from 3LL to 3HH and from 2LL to 2HH can be decoded within the unit process time Ti.

Figure 10A:
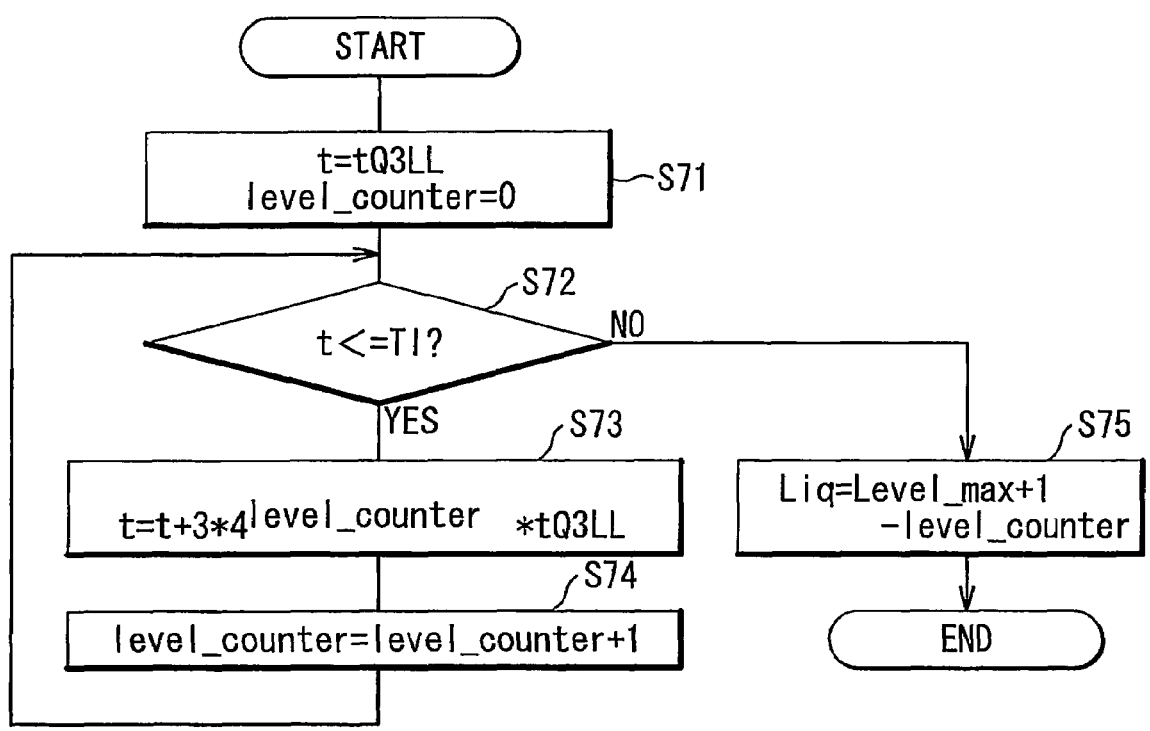

Next, the details of estimation of the process (Step S11) to determine the resolution level IQ_subband_level( ) in the inverse quantization process will be described, with reference to FIGS. 10A and 10B. First, the process time $t_{Q3LL}$ of the inverse quantization process to the code block CB 3LL by the inverse quantization section 120 is set to a summation time t ($t=t_{Q3LL}$ ($=t_0$)) at a step S71. Also, a level counter level_counter indicating the number of layers is set to "0". The process time $t_{Q3LL}$ can be calculated based on algorithm and the size of the code block 3LL which is equivalent to the number of pixels. At a step S72, whether or not the summation time t is within the unit process time Ti is determined. Because the summation time t is within the unit process time Ti at this time, a step S73 is carried out next. Because the level counter is "0" at the step S73, the summation time t is changed to $t=t_{Q3LL}+3*4^0*t_{Q3LL}$. As a result, the summation time t becomes $4*t_{Q3LL}$ ($=t_1$). That is, the summation time t of the code blocks 3LL to 3HH in the third layer is estimated. Subsequently, the level counter is incremented by one at a step S74. Thus, the process time of the following layer becomes possible to be calculated. After that, the flow returns to the step S72.

The step S72 is carried out as above-mentioned, and then the step S73 is executed. At the step S73, the summation time t is changed to $t_1+3*4^1*t_{Q3LL}$. That is, the summation time is $t(=t2)=4*t_{Q3LL}+3*4^1*t_{Q3LL}=16*t_{Q3LL}$. As a result, the summation time t to the second layer is found.

When the above-mentioned process is repeated and the summation time t passes the unit process time Ti at the step S72, the step S75 is carried out and the resolution level Liq of the inverse quantization process is determined. The summation time t of the above-mentioned process, the value of the level counter, and the resolution level Liq are shown in FIG. 10B.

Figure 11A:
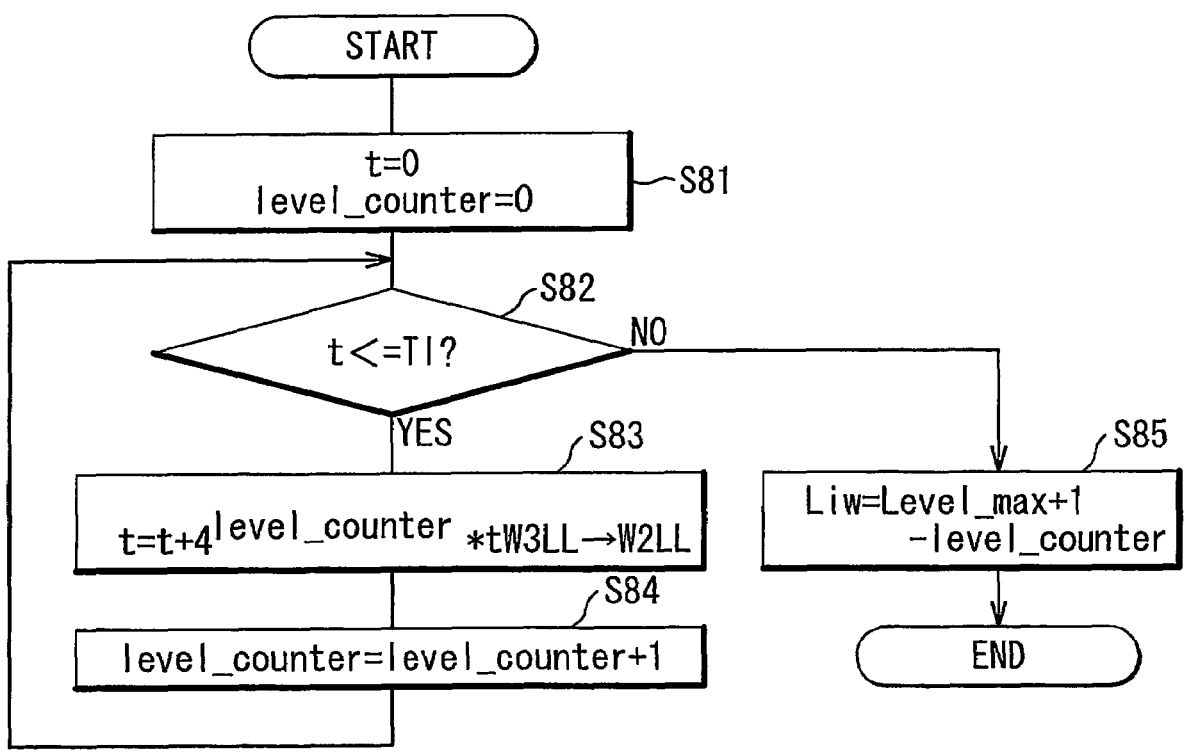

Next, the details of estimation of the process (Step S12) to determine the resolution level Liw (=IQ_subband_level( )) of the inverse wavelet decoding process will be described, with reference to FIGS. 11A and 11B. As seen from the comparison with FIG. 10A, the process shown in FIG. 11A is completely the same as while the inverse wavelet decoding process is adopted instead of the inverse quantization process.

First, the process time $t_{Q3LL}$ of the inverse wavelet decoding process to the code block CB of 3LL by the inverse wavelet decoding section 124 is set on a summation time t ($=t_{Q3LL}$ ($=t_o$)) at a step S81. The level counter level_counter showing the number of layers is set to "0". The process time $t_{Q3LL}$ can be calculated based on the algorithm and the size of the code block 3LL which is equivalent to the number of pixels, like the inverse quantization process. At a step S82, whether or not the summation time t is within the unit process time Ti is determined. At this time, because the summation time t is within the unit process time Ti, a step S83 is carried out next. Because the level counter is "0" at the step S83, the summation time t is calculated as $t=t_{Q3LL}+3*4^0*t_{Q3LL}$. As a result, the summation time t becomes $4*t_{Q3LL}$ ($=t_1$). That is, the summation time t for one layer of the code blocks 3LL to 3HH is estimated. Subsequently, the level counter is incremented by one at a step S74. Thus, the process time of the following layer is made possible to be calculated. After that, the flow returns to the step S82.

The step S82 is carried out, as mentioned above, and then the step S83 is carried out. The step S83 is carried out to set the summation time t to $t_1+3*4^1*t_{Q3LL}$. That is, the summation time is set to $t(=t2)=4*t_{Q3LL}+3*4^1*t_{Q3LL}=16*t_{Q3LL}$. As a result, the summation time to the second layer is found.

When the above-mentioned process is repeated and the summation time t passes the unit process time Ti at the step S82, the step S85 is carried out and the resolution level Liw of the inverse wavelet decoding process is determined. The summation time t of the above-mentioned process, the value of the level counter, and the resolution level Liw are shown in FIG. 11B.

Figure 8:
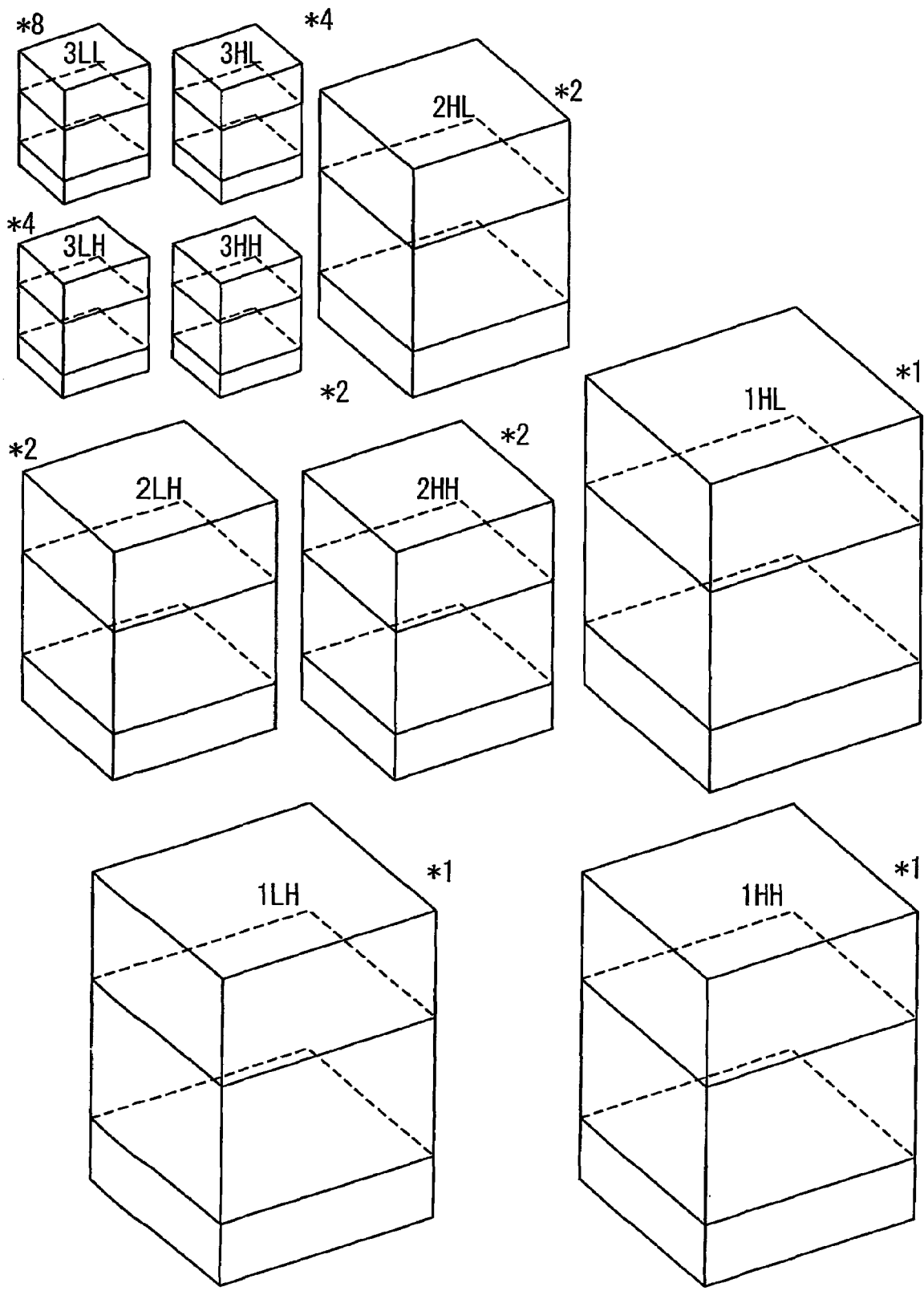
FIG. 8 is a diagram showing a weight coefficient allocated to each code block of the coded stream.

Next, the details of estimation of the process at the step S13 will be described with reference to FIG. 8. FIG. 8 shows weight coefficients W(CBi) previously allocated to the code blocks CB from 3LL to 1HH for the process time calculation.

Figure 7B:
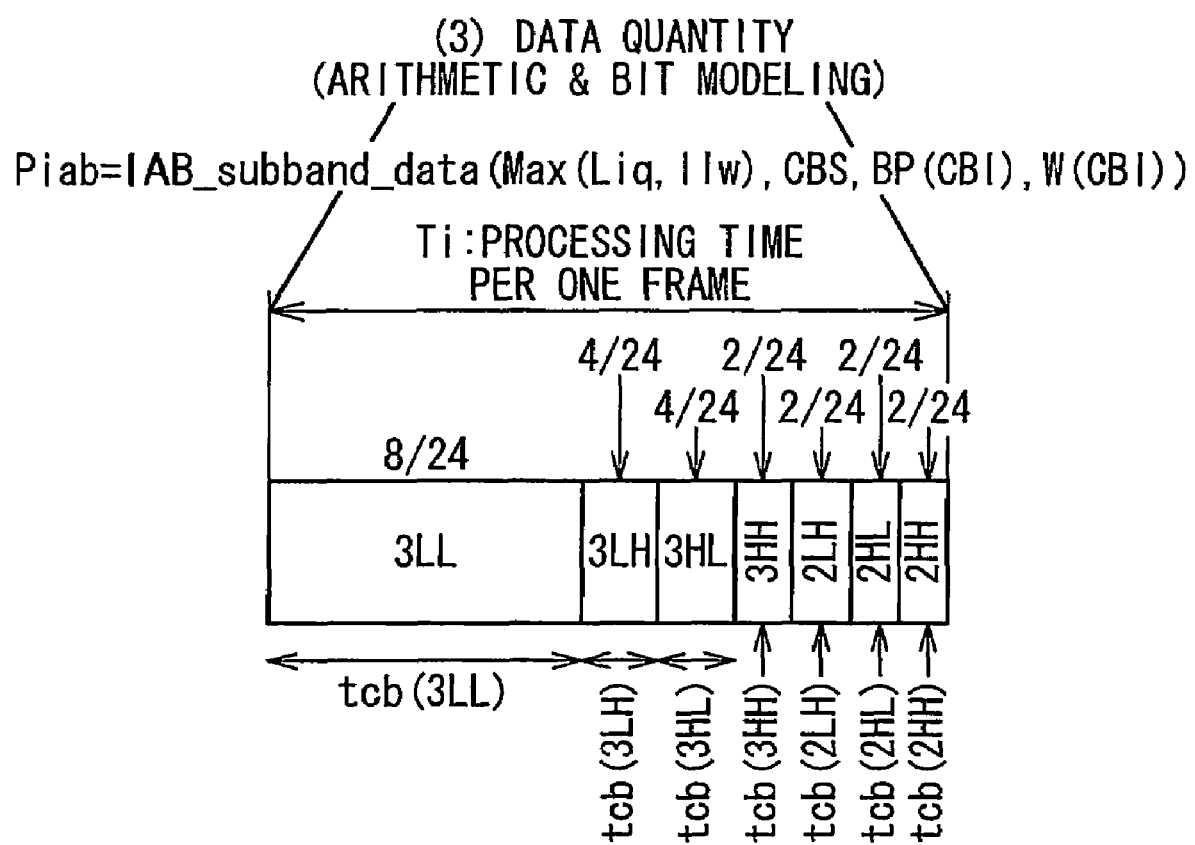

The largest weighting coefficient "8" is set to the code block 3LL which has the code data of the lowest frequency component used to replay the most basic nature of the original image. Next, the weighting coefficient "4" is allocated to the code blocks 3HL and 3LH which are next important, and the weighting coefficient "2" is allocated to the code blocks 3HH, 2HL, 2LH and 2HH, which are next important. Last, the smallest weighting coefficient "1" is set to code blocks 1LL, 1HL, and 1LH which have the code data of the higher frequency components. The decoding process time of each code block is determined based on a corresponding weight coefficient and is reserved such that the arithmetic decoding process and the bit modeling decoding process of the code blocks CB from 3LL to 2HH can be ended within the unit process time Ti. This result is shown in FIG. 7B. In other words, FIG. 7B is a diagram showing how to allocate the process time for the arithmetic decoding process and the bit modeling decoding process to each block. As described above, it is already determined that it is possible to decode the code books for two layers from 3LL to 3HH and from 2LL to 2HH and within the unit process time Ti. The process time is allocated to each code blocks in such a manner that a rate of the process time of each code block to the total process time is same as the rate of the weighting coefficient of the code block to a summation of the weighting coefficients of the code blocks 3LL to 2HH. Because the summation of the weighting coefficients of the code blocks 3LL to 2HH is "24", the process time $t_{cb}$(3LL) allocated to the code block 3LL is Ti*(8/24). In the same way, the process time $t_{cb}$(2HH) allocated to the code block 2HH is Ti*(2/24).

Figure 9:
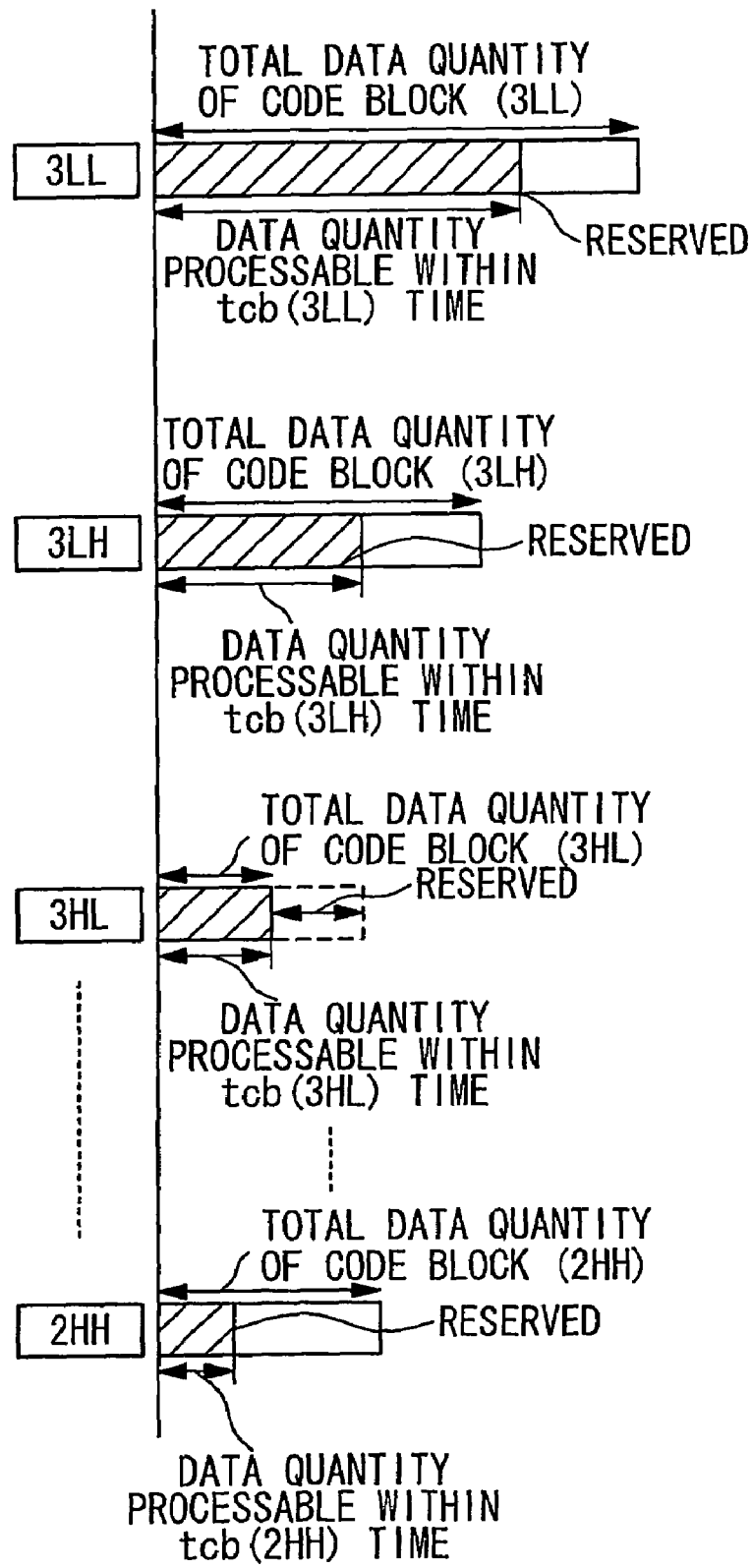
FIG. 9 is a diagram showing an original data process quantity of each code block and allocated data process quantity to an inverse quantization process and an inverse wavelet transform process.

Next, the allocation of the process time to each code block in the arithmetic decoding process and the bit modeling decoding process will be described, with reference to FIG. 9 and FIGS. 12 to 15. FIG. 9 shows a state that the bit planes to be processed within the process time allocated to each code block and shown in FIG. 7B are determined. As shown in FIG. 9, the process time which is longer than the other blocks is allocated to the code block 3LL. However, all the bit planes cannot be decoded within the allocated process time. At this time, a part of the bit planes on the LSB side is discarded without being decoded. In this case, however, the bit plane on the MSB side shows the outline of the image and the bit plane on the LSB side shows a detail change in the image expressed in the bit plane form. For this reason, any influence in perception are not given often even if the bit planes on the LSB side are discarded without being decoded. Also, in the same way, there is a case where the allocated process times of the code blocks 3LL and 3LH are short so that the decoding process is not carried out until the last plane. On the contrary, there is a case that the process time is left, like the code block 3HL. In such a case, this left process time is first allocated to the decoding process of the code block 3LL, so that the decoding process of the bit planes of lower levels on the LSB side are decoded in the code block 3LL, resulting in finer decompressed image. When the process time is still left even if the all the bit planes are processed, the left process time is allocated to another code block.

Figure 12:
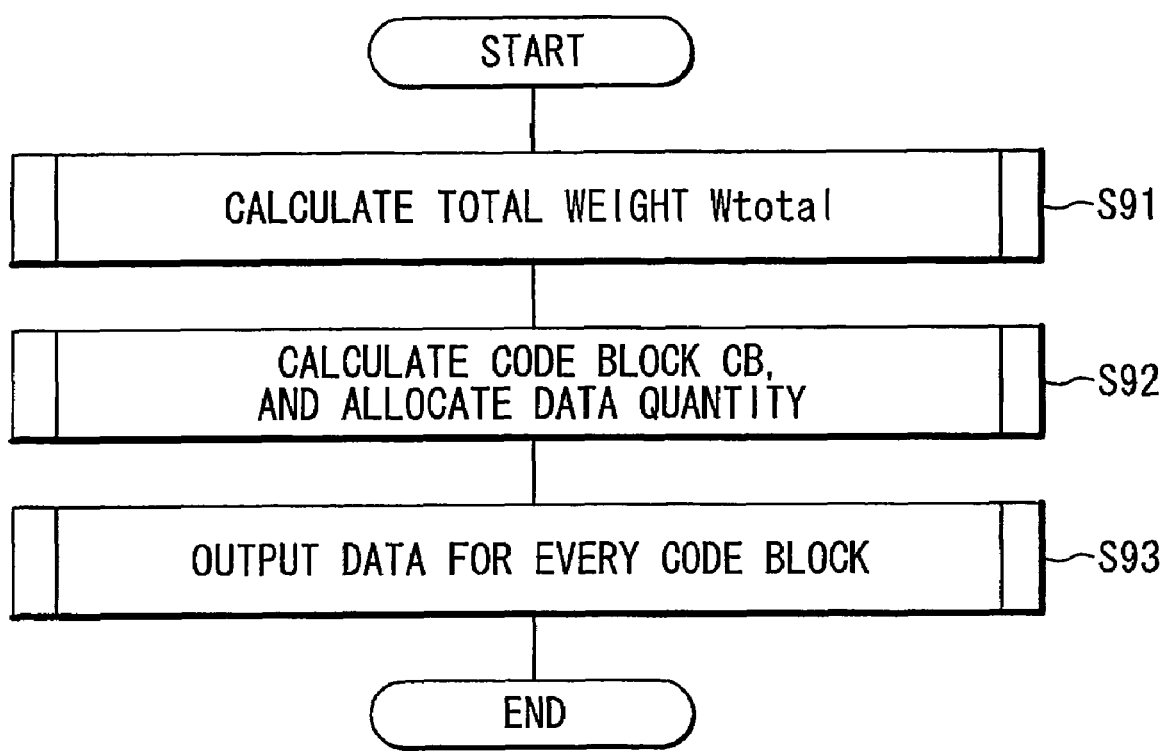
FIG. 12 is a flow chart showing an arithmetic decoding process and a bit modeling decoding process.

Next, the estimation of process times of the arithmetic decoding process and the bit modeling decoding process will be described in detail. Referring to FIG. 12, a total of the weight coefficients allocated to the code blocks of the two layers which have been determined to be processable is calculated at a step S91. The process time allocated to each code block CB is calculated at a step S92. The process time for each code block is outputted at a step S93.

Next, the details of the steps shown in FIG. 12 will be described.

Figure 13:
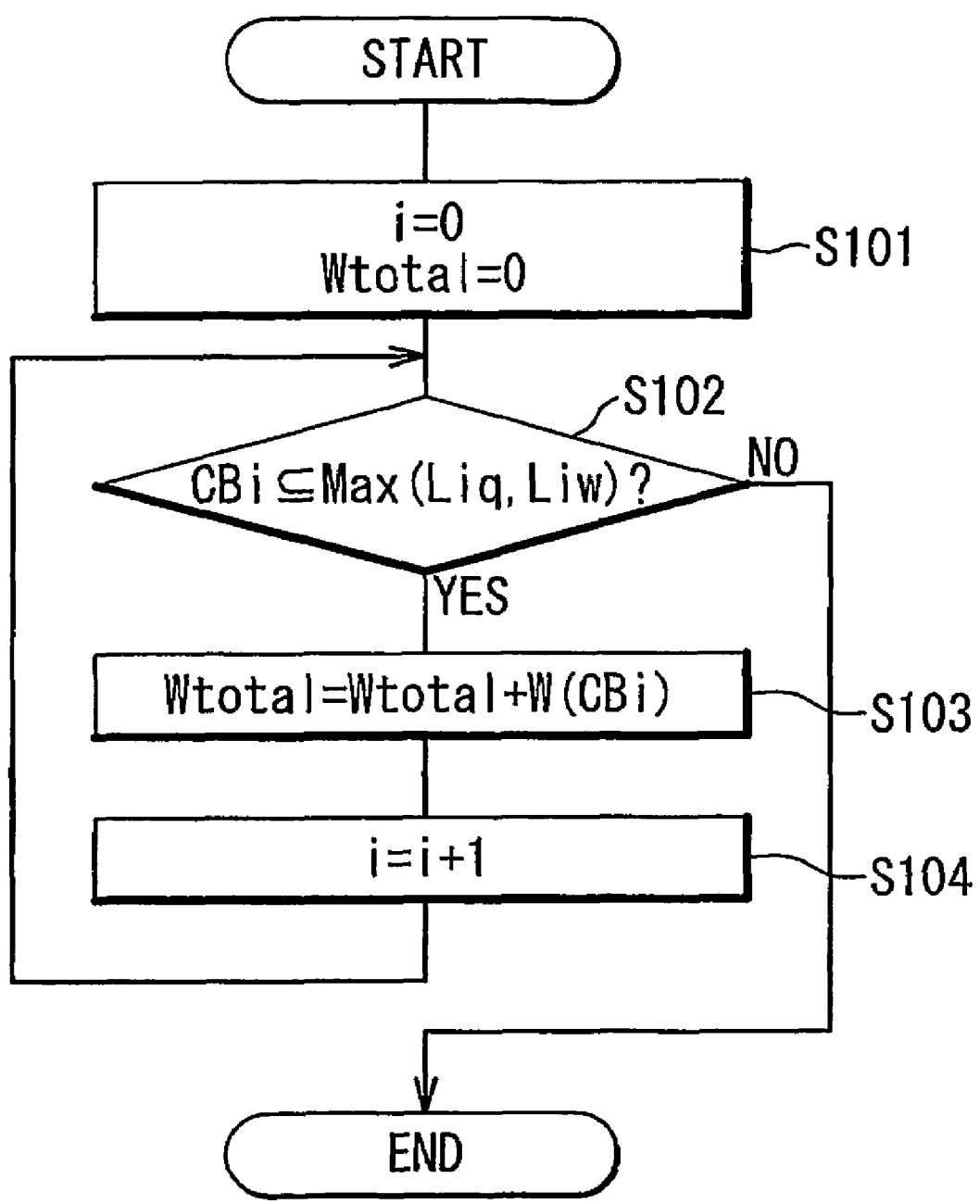
FIGS. 13, 14 and 15 are flow charts showing the details of the decoding process shown in FIG. 12.

Referring to FIG. 13, first, the process of calculating the total of the weight coefficients will be described. At a step S101, a variable i and s total weight $W_{total}$ are set to "0". Whether or not the code block as an object belongs to the layers that should be processed is determined at a step S102. When the code block object belongs to the layers, a step S103 is carried out and the weight coefficient allocated to the code block is added to the total weight $W_{total}$. Subsequently, a step S104 is carried out to increment the variables i by one and then the flow returns to the step S102. In this way, the weight coefficients allocated to all the code blocks which belong to the layer which should be processed are added.

Figure 14:
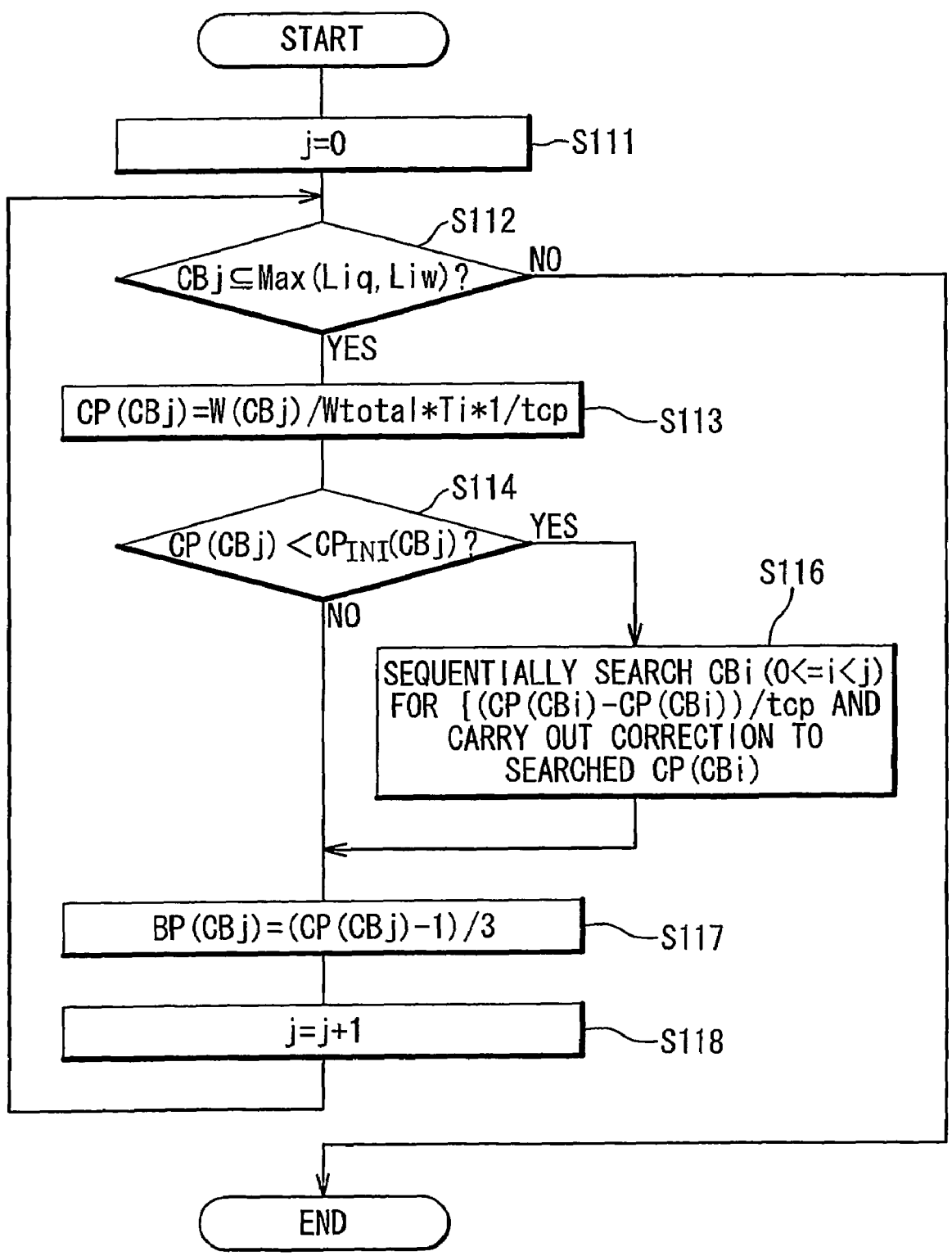

Next, the details of the calculation of the process time (Step S92) will be described with reference to FIG. 14. At a step S111, a variable j is set to "0". Whether or not the code block object belongs to the layers that should be processed is determined at a step S112. When the code block object belongs to the layers, a step S113 is carried out. In this case, a summation time t allocated to the code block is calculated based on (the weight coefficient of the code block)/(total weight)*(unit process time) (=$W(CB_j)/W_{total}*T_i$). Also, by dividing the summation time t by a unit calculation time $t_{cp}$ for the coding path, the number of coding paths $CP(CB_j)$ possible to process in the code block is calculated. After that, at the step S114, whether or not the number of coding paths $CP_{ini}(CBj)$ initially allocated to the code block is more than the calculated number of coding paths CP(CBj) is determined. If Yes, a step S116 is carried out, and if No, a step S117 is carried out. When the number of coding paths $CP_{ini}(CBj)$ initially allocated to the code block is more than the calculated number of coding paths CP(CBj), a remaining process time is present in the process time. On the contrary, when the number of coding paths $CP_{ini}(CBj)$ initially allocated to the code block is not more than the calculated number of coding paths CP(CBj), the remaining process time is not present in the process time.

At the step S116, the coding path is searched sequentially from the code block 3LL among the already processed code blocks which had been omitted because the process time is lack and an addition process of the searched coding path for the remaining process time is carried out to the coding path. After that, the step S117 is carried out.

At the step S117, the number of bit planes is calculated by subtracting 1 from the calculated number of coding paths CP(CBj) possible to process or the number of coding paths CP(CBj) additionally processed and then by dividing the subtracting result by 3 corresponding to RGB. After that, the variable j is incremented by one at a step S118 and the tep S112 is again carried out for the following code block. It should be noted that the state of the above-mentioned process is shown in FIG. 9, if the data quantity possible to process is read as the number of coding paths possible to process.

Figure 15:
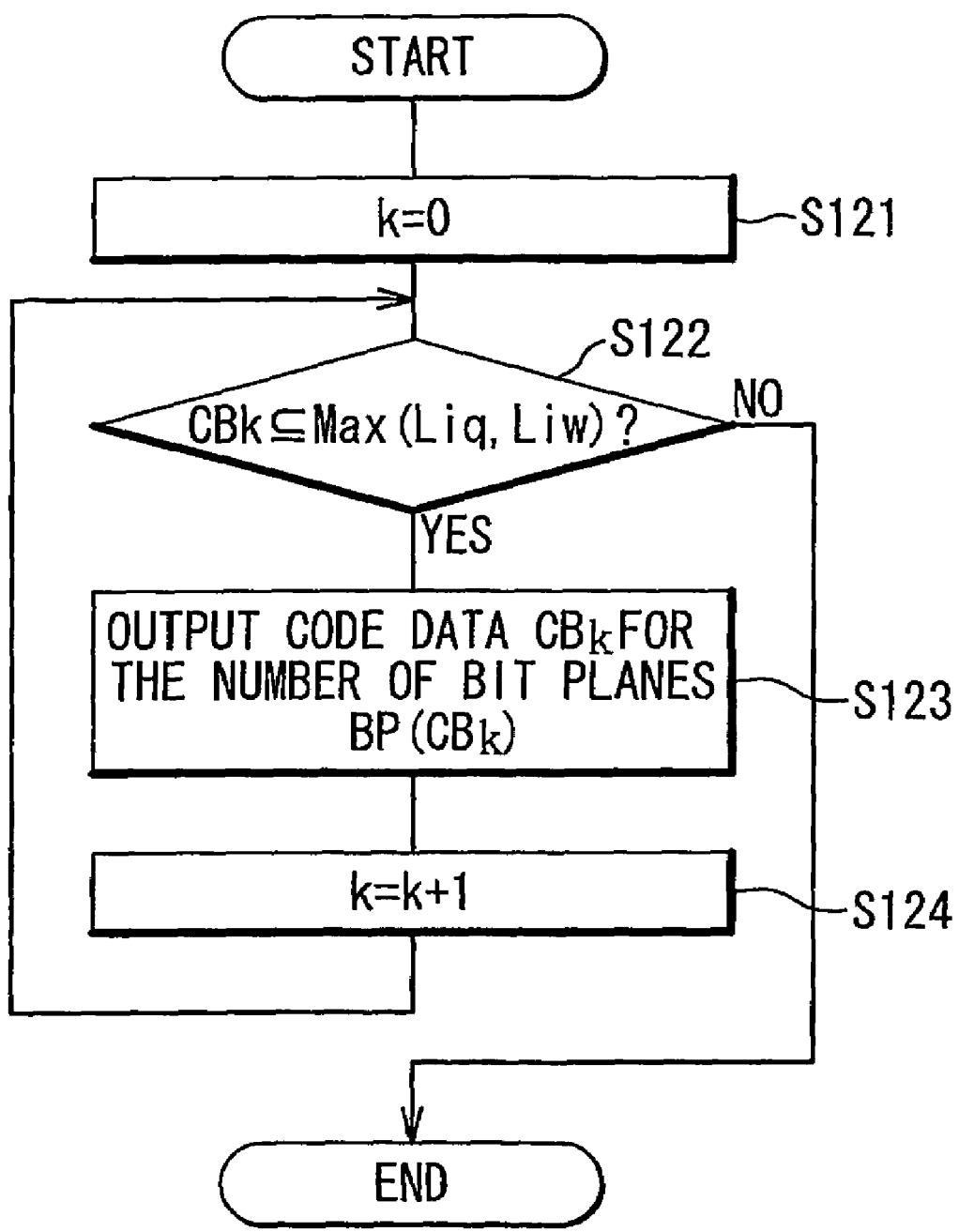

Next, the details of the output processing of the data (step S93) will be described with reference to FIG. 15. At a step S121, a variable k is set to "0". At a step S122, whether or not the code block as an object belongs to the layers to be processed is determined. If Yes, a step S123 is carried out. At the step S123, code data for the number of bit planes determined at the above step are outputted. After that, the variable k is incremented by one at a step S124, and the step S122 is again carried out for the following code block.

In this way, in the present invention, the process time of each decoding process is previously estimated and the layers and code blocks to be processed are same over the decoding processes. Therefore, the quality of the image after the decoding process is stable.

As described above, the address generating circuit 104 designates an address of coded data which should be transferred from the code buffer 103 to the image decoding section 112, based on the output data from the data quantity determining section 107. However, the data quantity determining section 107 may output the process time or data quantity to each section of the image decoding section 112. Each section may carry out the decoding process.

Also, in the above description, the weighting coefficients are fixedly allocated to the code blocks and stored in the data quantity determining section 107. However, the weighting coefficients may be supplied from the outside to the data quantity determining section 107 and may be dynamically changed for every frame image.

In the above description, the unit process time is predetermined. However, the total process time and the number of frame images may be supplied in the control parameter 101. In this case, the unit process time can be calculated from the total process time and the number of frame images.

As described above, the present invention is described, by taking JPEG (Joint Photographic Expert Group) as an example, but the present invention is applicable to another coding compression technique such as MPEG (Motion Picture Expert Group).

What is claimed is:

1. An image decoding apparatus that divides a coded image data into a plurality of code blocks of a plurality of layers based on a control parameter, and carries out a first image decoding process, a second image decoding process, and a third image decoding process to each of said plurality of code blocks, comprising:

an analyzing processor adapted to calculate a first process quantity for said second image decoding process and said third image decoding process within a process time that is taken for a decoding process to said coded image data, and calculate a second process quantity for said first image decoding process based on said first process quantity,
wherein said first image decoding process comprises an arithmetic decoding process and a bit modeling decoding process, said second image decoding process comprising an inverse quantization process, and said third image decoding process comprising an inverse wavelet conversion process; and
an image decoding processor adapted to obtain a decoded image by executing said second image decoding process and said third image decoding process to the coded image data after said first image decoding process based on said second process quantity.

2. The image decoding apparatus according to claim 1, wherein said analyzing processor is adapted to calculate a process time for each of said first image decoding process, said second image decoding process, and said third image decoding process to each of said plurality of code blocks based on a predetermined process time for each of said first image decoding process, said second image decoding process, and said third image decoding process, a unit process time for each of said first image decoding process, said second image decoding process, and said third image decoding process, and a predetermined weighting quantity assigned to said code black, and to determine a first number of code blocks, a second number of code blocks, and a third number of code blocks based on said predetermined process time and said calculated process time, and
wherein said image decoding processor is adapted to determine said first number of code blocks applicable with said first image decoding process within said predetermined process time for said first image decoding process, said second number of code blocks applicable with said second image decoding process within said predetermined process time for said second image decoding process, and said third number of code blocks applicable with said third image decoding process with said predetermined process time for said third image decoding process.

3. The image decoding apparatus according to claim 2, wherein said analyzing processor is adapted to determine said first number of code blocks based on said second number of code blocks.

4. The image decoding apparatus according to claim 2, wherein said image decoding processor is adapted to execute said first image decoding process, said second image decoding process, and said third image decoding process from a bit plane on an MSB side, and execute said first image decoding process, said second image decoding process, and said third image decoding process to subsequent code blocks without waiting for a completion of said first image decoding process, said second image decoding process, and said third image decoding process to all of a bit plane of a current code block, when said first image decoding process, said second image decoding process, and said third image decoding process for said current code block cannot be completed within said calculated process time.

5. The image decoding apparatus according to claim 4, wherein when said first image decoding process, said second image decoding process, and said third image decoding process to said current code block is completed within said calculated process time, said image decoding processor is adapted to allocate a remaining time of said calculated process time to said first image decoding process, said second image decoding process, and said third image decoding process for a portion of the code block that is not completed within said calculated process time.

6. The image decoding apparatus according to claim 1, wherein said coded image data comprises said control parameter.

7. An image decoding method that divides a coded image data into a plurality of code blocks of a plurality of layers based on a control parameter, and carries out a first image decoding process, a second image decoding process, and a third image decoding process to each of said plurality of code blocks, comprising:

calculating a first process quantity by an analyzing processor for said second image decoding process and said third image decoding process within a process time that is taken for a decoding process to said coded image data, and calculate a second process quantity for said first image decoding process based on said first process quantity,
wherein said first image decoding process comprises an arithmetic decoding process and a bit modeling decoding process, said second image decoding process comprising an inverse quantization process, and said third image decoding process comprising an inverse wavelet conversion process; and
obtaining a decoded image by a decoding processor by executing said second image decoding process and said third image decoding process to the coded image data after said first image decoding process based on said second process quantity.

8. The image decoding method according to claim 7, further comprising:

calculating a process time by the analyzing processor for each of said first image decoding process, said second image decoding process, and said third image decoding process to each of said plurality of code blocks based on a predetermined process time for each of said first image decoding process, said second image decoding process, and said third image decoding process, a unit process time for each of said first image decoding process, said second image decoding process, and said third image decoding process, and a predetermined weighting quantity assigned to said code black, and to determine a first number of code blocks, a second number of code blocks, and a third number of code blocks based on said predetermined process time and said calculated process time; and determining said first number of code blocks applicable with said first image decoding process within said predetermined process time by the decoding processor said first image decoding process, said second number of code blocks applicable with said second image decoding process within said predetermined process time for said second image decoding process, and said third number of code blocks applicable with said third image decoding process with said predetermined process time for said third image decoding process.

9. The image method according to claim 8, further comprising determining said first number of code blocks by the analyzing processor based on said second number of code blocks.

10. The image decoding method according to claim 8, further comprising executing said first image decoding process, by the decoding processor, said second image decoding process, and said third image decoding process from a bit plane on an MSB side, and executing said first image decoding process, said second image decoding process, and said third image decoding process to subsequent code blocks without waiting for a completion of said first image decoding process, said second image decoding process, and said third image decoding process to all of a bit plane of a current code block, when said first image decoding process, said second image decoding process, and said third image decoding process for said current code block cannot be completed within said calculated process time.

11. The image decoding method according to claim 10, wherein when said first image decoding process, said second image decoding process, and said third image decoding process to said current code block is completed within said calculated process time, further comprising allocating a remaining time of said calculated process time to said first image decoding process by the decoding processor, said second image decoding process, and said third image decoding process for a portion of the code block that is not completed within said calculated process time.

12. A computer-readable storage medium encoded with a computer program for causing a processor to perform an image decoding method of decoding a decoded image data from a coded image data through a plurality of decoding processes, comprising:

determining a process quantity of said coded image data in said plurality of image decoding processes within a unit process time based on a parameter for said coded image data; and carrying out said plurality of image decoding processes to said coded image data for the determined process quantity.

* * * * *